C. W. BAKER.
LOCOMOTIVE OR SELF PROPELLED VEHICLE FOR USE UPON RAILWAYS.
APPLICATION FILED AUG. 13, 1909.
1,016,602.
Patented Feb. 6, 1912.
6 SHEETS—SHEET 4.
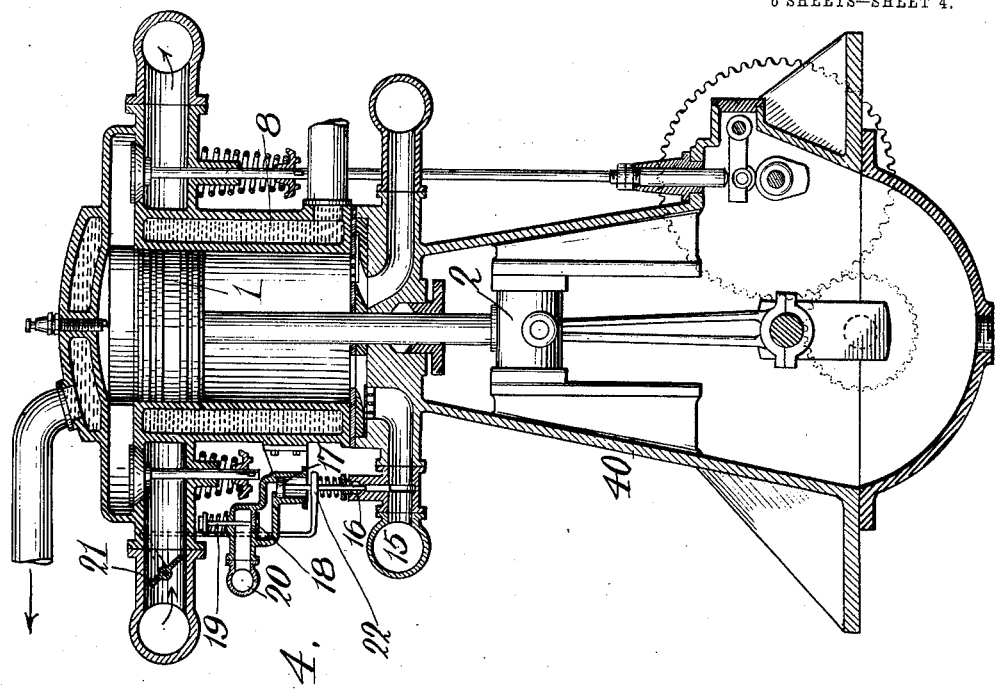
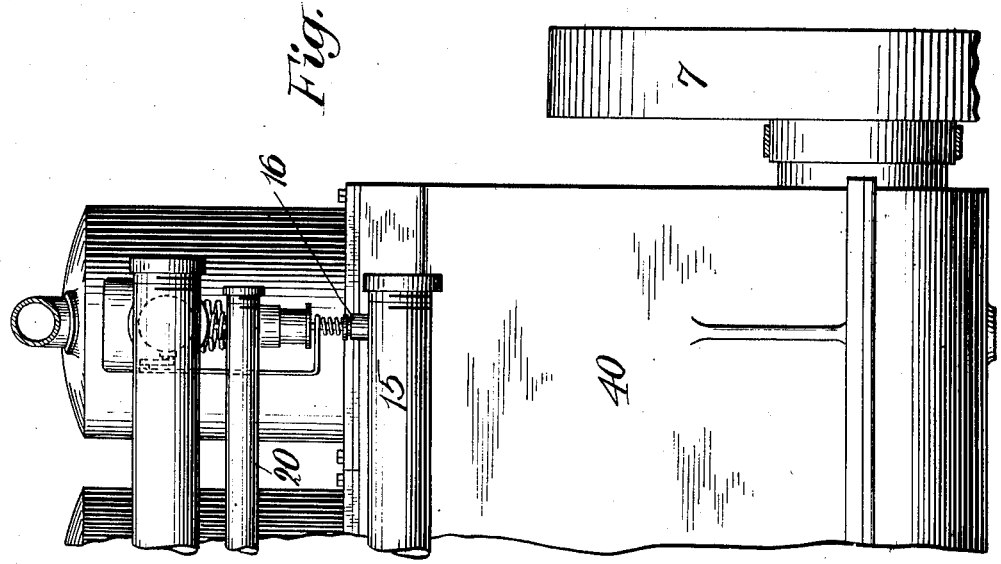
INVENTOR
Charles Whiting Baker
BY Gifford Bull
ATTORNEYS C. W. BAKER.
LOCOMOTIVE OR SELF PROPELLED VEHICLE FOR USE UPON RAILWAYS.
APPLICATION FILED AUG. 13, 1909.
1,016,602.
Patented Feb. 6, 1912.
6 SHEETS—SHEET 5.
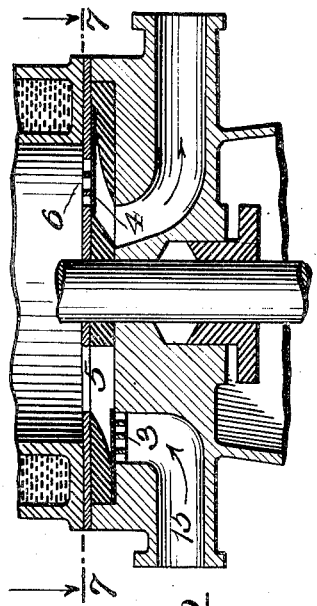
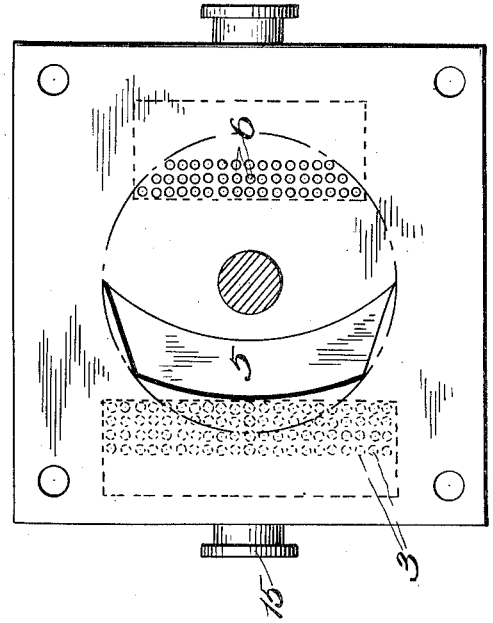
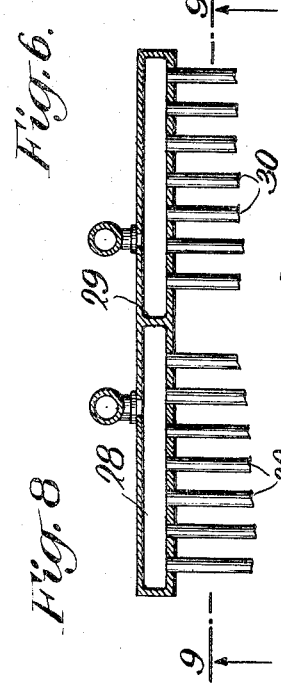
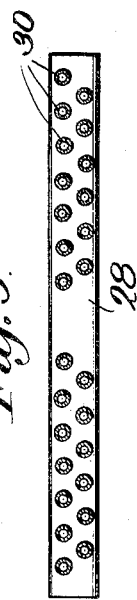
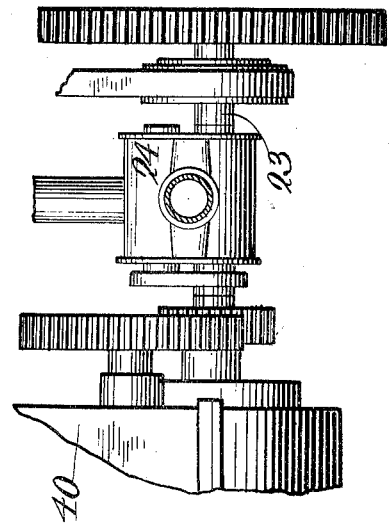
WITNESSES:
INVENTOR
Charles Whiting Baker
BY
ATTORNEYS C. W. BAKER.
LOCOMOTIVE OR SELF PROPELLED VEHICLE FOR USE UPON RAILWAYS.
APPLICATION FILED AUG. 13, 1909.
1,016,602.
Patented Feb. 6, 1912.
6 SHEETS—SHEET 6.
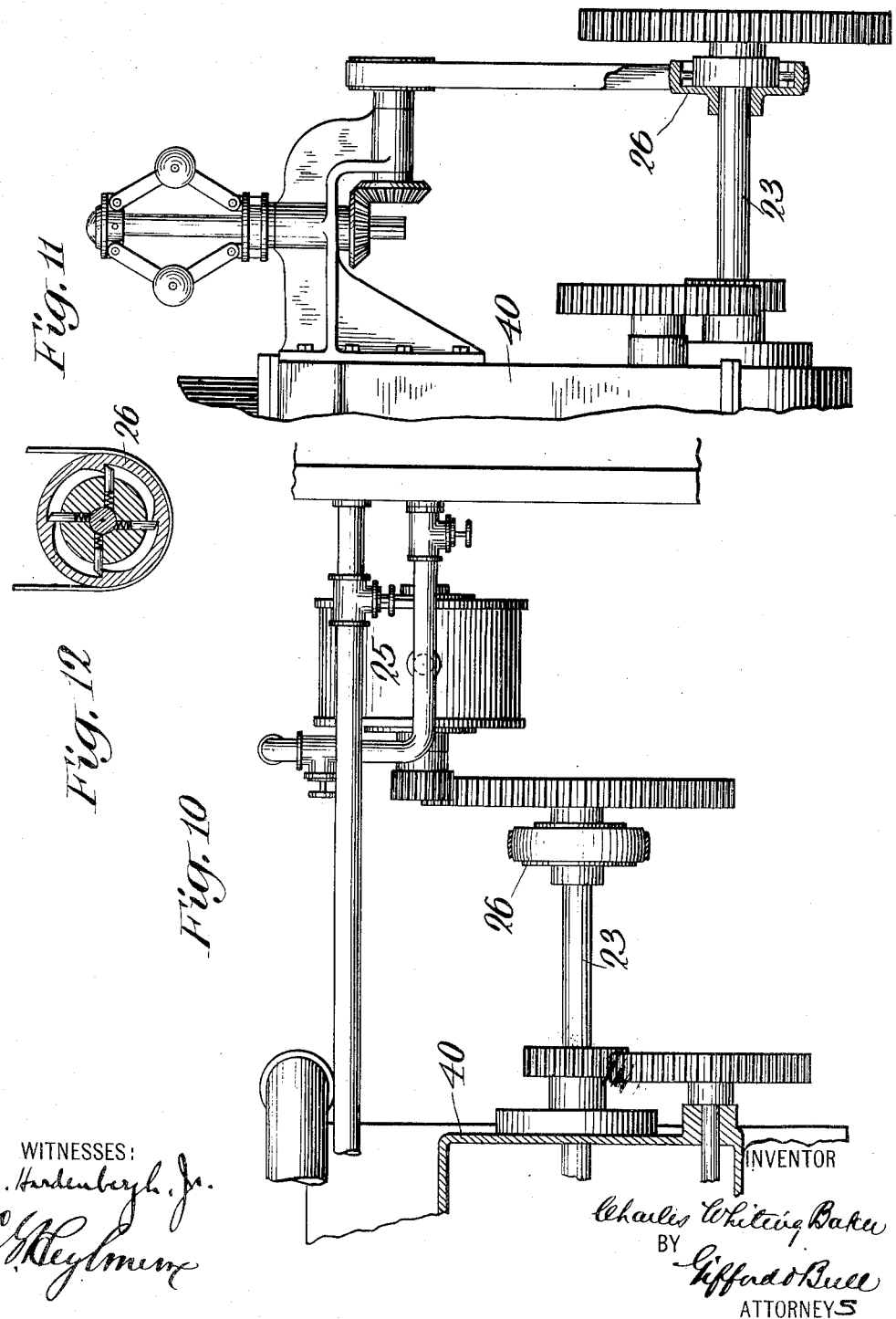

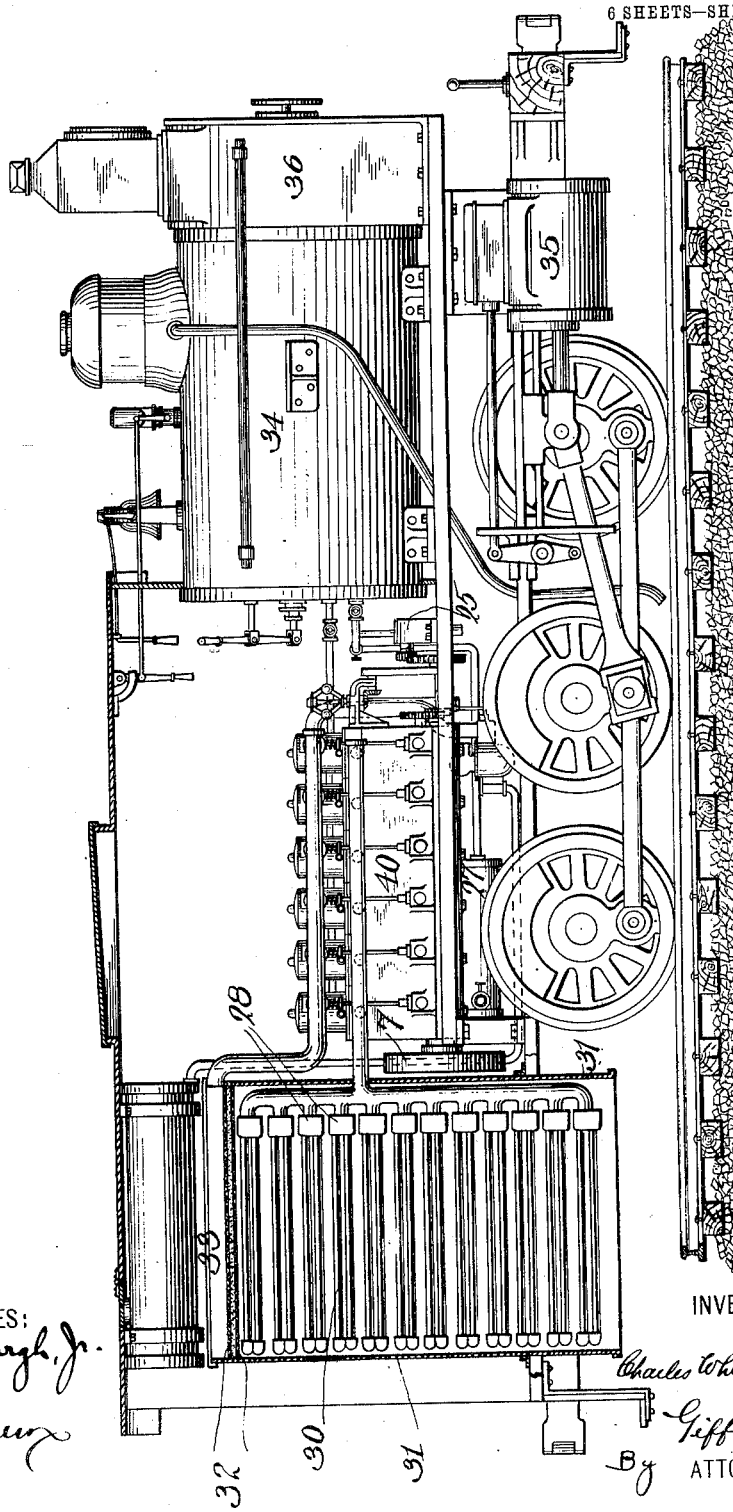

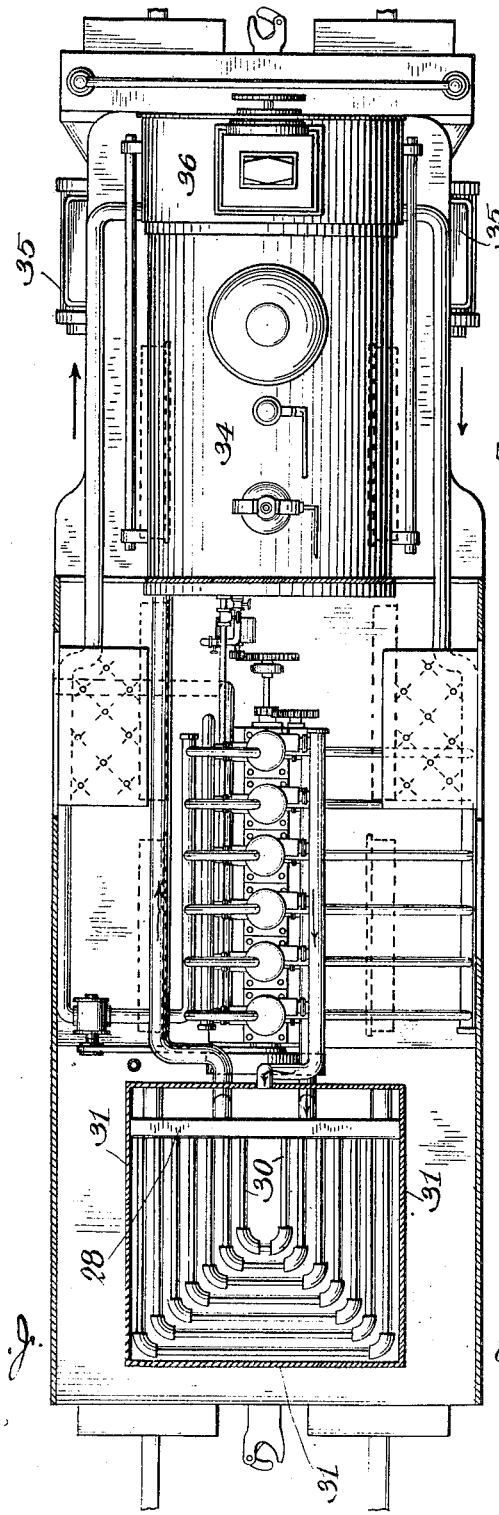
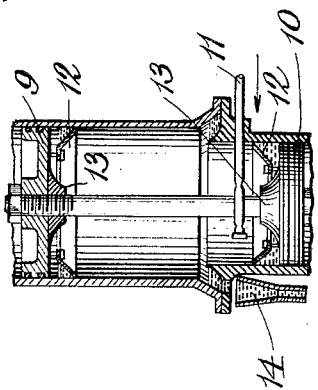

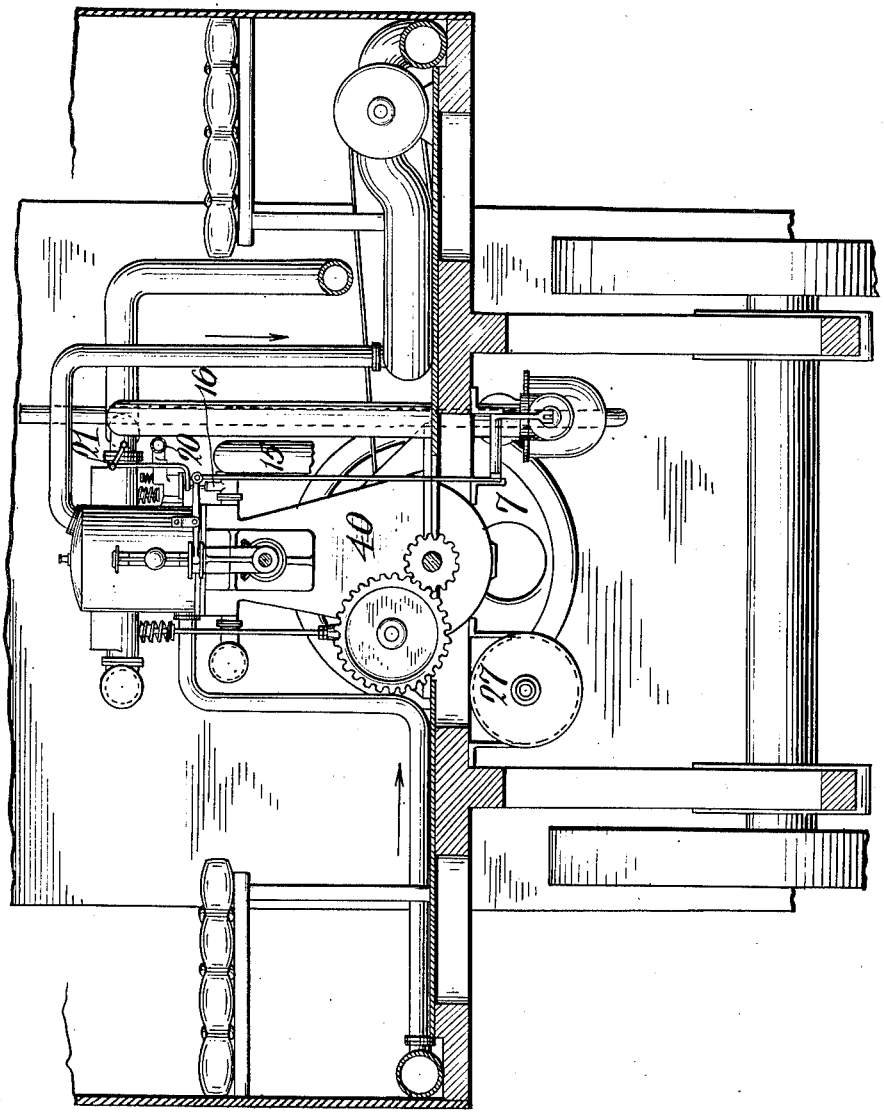

UNITED STATES PATENT OFFICE.

CHARLES WHITING BAKER, OF MONTCLAIR, NEW JERSEY.

LOCOMOTIVE OR SELF-PROPELLED VEHICLE FOR USE UPON RAILWAYS.

1,016,602. Specification of Letters Patent. Patented Feb. 6, 1912.

Application filed August 13, 1909. Serial No. 512,666.

*To all whom it may concern:*

Be it known that I, CHARLES WHITING BAKER, a citizen of the United States, residing at Montclair, in the county of Essex and State of New Jersey, have invented certain new and useful Improvements in Locomotives or Self-Propelled Vehicles for Use upon a Railway, of which the following is a specification.

It is the particular object of my invention to apply the internal combustion type of engine to the propulsion of railway locomotives and to do this without sacrificing the reliability and the adaptation to the necessities of railway service which characterize the present steam locomotive.

In previous applications of the internal combustion engine to locomotives, the driving wheels of the locomotive have been mechanically connected to the engine, and the necessities of starting, reversing and exerting variable speed and power have been provided for by various mechanical arrangements of gears and clutches. Such machines, however, have been only used for small power and slow speed and cannot fill the requirements of regular railway service.

Self-propelled vehicles or motor cars have also been made in which an internal combustion engine, carried on the vehicle is made use of to drive an electric generator, the current from which drives electric motors which propel the car. Such machines, however, are exceedingly heavy, complicated and costly, and are besides wholly unsuited to the work required of high-power locomotives.

The problem of successfully adapting the internal combustion motor to the railway locomotive is one of great importance because of the fuel economy which may be thereby effected. An ordinary steam locomotive under service conditions transforms into mechanical power only 2 per cent. to 6 per cent. of the total heat energy in the fuel it consumes. Internal combustion engines are in use, however, which transform into work fully 30 per cent. of the heat energy of the fuel burned in their cylinders. Besides, the discharge of smoke and steam from ordinary locomotives makes them objectionable for use in towns and cities, and is leading to general agitation for the adoption of electric locomotives instead. These have, however, the great disadvantage of being tied always to a central power station and requiring the construction of a third rail or overhead wire to furnish current. The enormous expense of electric installation, also, makes the development of some other efficient substitute for the steam locomotive of great importance. For use in forested regions, also, an efficient and economical substitute for the steam locomotive is greatly needed.

The method by which I adapt the internal combustion motor to the railway locomotive is broadly by using compressed air as an intermediate medium between the motor and the propelling cylinders of the locomotive. That is to say, I carry on the locomotive vehicle an air compressor driven by an internal combustion engine. The compressed air thus furnished I use in cylinders similar to those of an ordinary locomotive. I provide a storage tank or reservoir for the compressed air into which the air from the compressors is discharged, and from which the supply of air for the propelling cylinders is drawn. This reservoir serves to store a certain amount of power so that the variation in the demand for air upon the compressor is not so sudden.

Previous inventors have indeed proposed to propel small tramway locomotives and street cars by compressed air generated on the vehicle by the power of an internal combustion engine; but in order to propel locomotives of such size and power as are used in regular railway service, it is necessary first to produce an air-compressing apparatus with its driving engine, which will be of sufficient capacity to furnish the necessary amount of air, and yet will be so compact and so light in weight that it may be carried on the locomotive. It is also necessary that the air-compressing engine shall be under such control as to automatically respond to the great and sudden variation in demand for air for the locomotive propelling cylinders.

In my improved locomotive I use a special type of air compressor, the construction of which permits it to be run at very high speed, giving a large output of air from a small-size machine. Further, instead of cooling the air delivered from the compressor as in ordinary practice, I retain its heat by proper insulation and add to it a still further amount of heat by exposing it to the hot exhaust gases from the internal combustion engine in a suitable heater.

Further, instead of using compressed air of a high pressure, say 70 to 100 lbs., as in ordinary practice, I prefer to use air of very low pressure, say 25 to 60 lbs. per square inch. With these low pressures, the air delivered from the compressor is in condition to receive a large additional amount of heat with consequent gain in efficiency, and yet without attaining a temperature involving difficulties with lubrication. In the use of such low-pressure air, moreover, losses in efficiency due to leaks in valves, etc., are much reduced.

The ordinary internal combustion engine is ill adapted to operate under wide variations in load. The locomotive, however, must frequently start and stop. Its throttle is now pulled wide open and again closed entirely while drifting under headway or down a grade. To permit successful and economical operation of the internal combustion engine under such conditions, I adopt a multi-cylinder machine, and provide means by which the number of cylinders in action will be automatically proportioned to the demand for air, the suddenness of such variations being modified by the storage as before mentioned.

While the proportions of the parts will be somewhat varied according to the service for which the locomotive is to be used, it may be here pointed out that for locomotives intended for switching service, I provide a particularly large reservoir and make provision for considerable variation in the pressure therein. Compressed air is accumulated under higher pressure for starting a train, when the maximum pull is required. On switching locomotives, too, the air compressor can be of comparatively small capacity, as the actual average power developed by such locomotives is quite small and the large slow-moving pistons of the locomotive can be supplied with air by the small high-speed pistons of the compressor.

My invention is illustrated in the accompanying drawings, in which:

Figure 1 is a general elevation, partly in section, of a switching locomotive arranged on my system. Fig. 2 is a plan of the same. Fig. 3 is a cross-section. Fig. 4 is a vertical cross-section through one of the cylinders of the engine-compressor. Fig. 5 is a part side elevation of the same. Fig. 6 is a section through the bottom of the air cylinder showing the air valves. Fig. 7 is a plan of the same. Fig. 8 is a section of the headers used in the air superheater. Fig. 9 is an elevation of a header showing the staggering of the pipes. Fig. 10 is a plan of the end of the engine showing the starting gear. Fig. 11 is a side elevation of the same, showing the governor and a section of the starting clutch. Fig. 12 is a cross-section of the starting clutch. Fig. 13 is an elevation of the end of the shaft showing a rotary blower for use in connection with the air compressor. Fig. 14 is a section through the air and power cylinders when constructed as separate cylinders of differing diameter, and shows also the cooling system used.

Similar reference numerals refer to the same parts throughout the series of drawings.

The combined internal combustion engine and air compressor, a cross-section of which is shown in Fig. 4, consists of a vertical multi-cylinder engine, similar in type to the gasolene engines used on shaft-driven automobiles, but arranged to have the same cylinder used for the generation of power and for air compression. The lower end of the cylinder is closed by a head, in which are placed suitable valves controlling the inlet and outlet of air. Thus the power is applied to the upper face of the piston 1 while the lower face of the piston compresses air on its downward stroke. The piston rod is attached to a cross-head 2 running in guides as in ordinary steam-engine construction.

Each of the pistons is connected to a crank on a common shaft by the usual connecting-rod mechanism. I prefer to use four, six, eight or more cylinders and to connect each pair of cylinders to cranks 180 degrees apart, so that the reciprocating and rotating parts attached to the opposite cranks of a pair will balance each other. Successive pairs of cranks are spaced equally about the circle to give uniform torque upon the shaft. A fly-wheel (7, Fig. 5) may be attached to the shaft.

As all the external work done by the engine is done by the lower face of the piston in compressing air, the power is applied to the work in the most direct manner, and the amount of work transmitted through the connecting rods, cranks and shaft is reduced to only that necessary for the different cylinders to aid each other at different parts of the engine cycle. Thus the friction loss in the engine is reduced.

In ordinary types of air compressor, the valves are usually cylinders of considerable weight; and when high speed is attempted they pound their seats and cause rapid wear. In my improved valve I secure extreme lightness by making the valves thin, flexible sheets of some elastic non-corrodible metal, such as bronze, and they close of their own elasticity against the entering current of air just as the piston reaches the end of stroke; thus a cushioned effect is produced. I am enabled to use these very thin valves by making the seat a plane surface with a multiplicity of orifices, so that the thin metal of the valve is strong enough to bridge across these orifices without being bent. In Figs. 6 and 7 these air valves are shown on an enlarged scale, 3 being the inlet valve and 4 the discharge valve. Fig. 7 shows how a large area is secured for the entry and exit of air, 5 being the opening by which the air enters the cylinder and 6 the orifices through which it escapes. The valves 3 and 4 are attached at one end and are bent upward from their seats when air pressure is exerted on their under side. The valves are returned to their seats by their own elasticity and are held there firmly by the air pressure on their backs until the end of the stroke.

For lubrication of the cranks and crossheads, I prefer to inclose all the moving parts below the lower cylinder head in a tight casing 40 and use so-called splash lubrication. For lubrication of the pistons in the cylinders, I prefer to use forced lubrication, the oil being forced by a pump through a pipe which emerges directly upon the interior of the cylinder. The water jacket applied to the barrel of the cylinder (8, Fig. 4), as usual in gas-engine practice, serves also for the air compression. While the temperature of the cylinder walls may be somewhat higher than in ordinary air compressors, this is no serious disadvantage as the air is used hot in the propelling cylinders. When, however, it is desired to deliver the compressed air as cool as possible, and also where it is desired to deliver compressed air at a higher or lower pressure than could be secured by using an air-compressing cylinder of the same diameter as the power-developing cylinder, I vary the above-described construction, as shown in Fig. 14, by using separate cylinders of different diameters for the power development and the air compression, these cylinders being placed close together with their respective pistons mounted on the same rod; 9 being the piston of the engine and 10 the piston of the compressor. In this construction also I simplify the cooling and lubrication of the cylinders and dispense with the water jacket. Instead, I bring a pipe 11 from the cooling water system into the space between the upper and lower pistons. Water from this pipe may issue as spray or may simply drop into the cylinder beneath. In either case the rapid up-and-down motion of the pistons will throw the water against every part of the interior of the cylinders and will cool the pistons as well. To make certain the cooling of the highest portion of the gas cylinder and the lowest portion of the air cylinder, which are uncovered for the least time during the stroke, I attach rings 12, 12 to the face of each piston, which trap the water, and I also place deflecting surfaces 13, 13 on the piston rods, which throw the flying water into these traps. The surplus water collects in the annular space at the junction of the upper and lower cylinders and is carried off by the drain pipe 14. The cylinder surfaces being thus deluged with water, and there being no side pressure upon the pistons as in the case of single-acting trunk pistons, lubrication of the cylinders with oil is rendered unnecessary.

In order to vary the output of the air compressor according to the draft of air for driving the propelling cylinders, I provide means for varying the number of cylinders in action. This consists in general of attaching an automatic unloader, such as are in general use in connection with air compressors, to each cylinder in such a manner that as the pressure rises in the air reservoir, successive cylinders will be cut out of action. As shown in Fig. 4, to the inlet pipe 15 of each air compressing cylinder is attached a gate 16, and this gate is moved by a small piston 17. Compressed air is admitted behind this piston to close the gate through an orifice 18, which is kept closed by a spring 19 until the pressure in the reservoir transmitted through the pipe 20 exceeds a certain point. Then the air is admitted behind the piston 17 and the gate is closed. At the same time a valve 21 is closed in the pipe which delivers gasolene vapor to the engine inlet valve. Thus the cylinder is cut out of action and the piston moves up and down in a vacuum.

By adjustment of the spring 19, the cutting out of the several cylinders may be made to take place successively until only one cylinder remains in operation. Upon this cylinder the automatic unloader is arranged to cut out the air end only, leaving the power end to drive the whole machine. A suitable type of governor controls the gas end of this cylinder, by which it develops enough power to keep the engine turning over at moderate speed.

When the compressed air is drawn from the reservoir and the pressure falls, the process above described is reversed. Successive cylinders are put into action through the movement of the piston 17 by the spring 22, until the machine is delivering its full output of air. In the case of a switching locomotive this process may be slightly varied, by suitable arrangement of the automatic unloaders, so that the air ends of the cylinders will be cut out of action earlier than the gas ends. For example, in a six-cylinder machine, one or two air ends may be cut out and the remaining four air ends driven by all six of the gas ends, thus enabling a considerably higher air pressure to be reached without stalling the compressor or materially slowing its speed. While this air-compressing engine is designed especially for use on the locomotive which is herein described, its advantages of compactness, efficiency and adaptation to a variable load make it applicable also for other purposes where compressed air is desired. In such installations, where a higher pressure of air is desired than can be conveniently or economically attained in a single cylinder, the machine may be adapted for use as a two-stage machine, one cylinder delivering compressed air to another, with an intercooler between in the customary manner. The same machine may be used with steam instead of explosive gas in the upper end of the cylinder, or in the upper cylinder shown in Fig. 14, so that it becomes a single-acting steam engine driving a single-acting air compressor, but with the action occurring in opposite ends of the same cylinder as heretofore explained.

In the operation of air-compressors at high altitudes, the output is reduced on account of the rarity of the air drawn into the compressing cylinders. In cases where my apparatus is to be used at high altitudes, therefore, I provide an auxiliary rotary compressor, driven by the main shaft of the engine and delivering the air under moderate pressure to the inlet pipes of the compressing cylinders. This construction is shown in Fig. 13, where 23 is the main shaft of the engine, and 24 is the rotary compressor. When, however, the capacity of the compressing engine exceeds the demand for air, and cylinders are cut out as before explained, the inlet pipes from the cylinders are automatically opened to the external air and the rotary compressor runs freely, doing no work of compression.

As already explained, the gas engine compressor can be kept running even when no air is being delivered by it, and it is preferable to do this during ordinary stops of the locomotive, such as at stations or in switching service. When, however, it is desired to start the machine from a stop, it may be done with compressed air taken from the storage reservoir. Valves may be attached to the cylinder not fitted with automatic cut-out, by which compressed air may be admitted to and exhausted from both ends of said cylinder until the engine is under way and explosions within the cylinder can begin. I prefer, however, to use a small starting engine, such as the Dake, which by speed-reducing gearing may turn the main engine. This is shown in Fig. 10. The starting engine 25 is connected by a ratchet clutch 26 to the main engine shaft 23, so that when the main engine starts, the starting engine 25 is released and stopped. This starting engine is likewise driven with compressed air. I supply also a small auxiliary air reservoir 27 which may also be the main reservoir for the air-brake system. In the rare event that the engine has to be started with no stock of compressed air either in the large reservoir on the locomotive or in this auxiliary reservoir, this reservoir may be charged from some other source of compressed air, as for example the brake pipe of another train, or it may be charged with a hand pump.

While I have shown in the drawings an ordinary type of gasolene engine for the power end of the engine-compressor, I contemplate also the use of other types of engine in which, by suitable arrangements for volatilization and ignition, heavier oils, such as kerosene, fuel oil and crude oil may be used.

For heating the compressed air before its passage to the propelling cylinders, I pass it through a heater similar in general design to the pipe coils used for heating air by steam. My superheater contains some special features, however, designed to permit free expansion and contraction of the parts and uniform circulation.

The superheater (see Figs. 1, 2, 8 and 9) is made up of elements, each of which consists of a tube 28 which may be partially flattened on one side and with a partition 29 midway of its length. Into the flat face of this pipe are screwed two tiers of pipes 30, 30. Each of these pipes 30 is of U-shape, made up with three straight pieces and elbows, and the pipes vary in length so that substantially the whole of a rectangular space to one side of the header is filled with the pipes. The upper and lower tiers of pipes 30, 30 in each header are staggered, as shown in Fig. 9. To make up the heater, a number of these elements are superposed, and the air delivered by the compressor is led through branches into one side of each element, while from the opposite end pipes lead to a main pipe, which passes direct to the air reservoir. This whole mass of piping is inclosed in a suitable casing 31 protected by non-conducting covering, and the exhaust gases from the engine are led around the pipes. To equalize the flow of the exhaust gases among this mass of pipes, I place on the top or the bottom two perforated plates or wire netting (32, Fig. 1), and between these plates I place a layer of pebbles about the size of marbles. The gases from the engine are exhausted into a chamber 33 on the opposite side of these pebbles from the heater and percolate through the pebbles into the heater. Any tarry matter in the gases lodges on the pebbles, and they also serve to equalize the heat in the entering gases, and prevent explosions occurring inside the heater. A similar arrangement of piping may be used for cooling compressed air, the pipes in this case being placed in a tank through which water is caused to flow. The compressed air after passing through the heater is led into the reservoir 34 which I protect by suitable non-conducting covering to retain the heat in the air. From the reservoir, through a suitable throttle valve, the air passes to the propelling cylinders 35. These are of the ordinary construction, but are made of larger diameter to obtain equal power with the low pressure of air employed. These cylinders are also arranged to utilize the air at long cut-offs only, so as not to expand the air below atmospheric pressure and retard the piston during the latter part of the stroke. With a valve motion giving these long cut-offs, also, the low-pressure air will not be throttled in the cylinder ports. The speed and power of the locomotive are regulated chiefly by the throttle-valve governing the flow of air to the cylinders, and not by varying the point of cut-off in the cylinder with the reverse lever.

In the steam locomotive the exhaust is led through a contracted orifice or exhaust nozzle to produce a draft upon the fire. In my locomotive, no draft being required, I lead the air exhausted from the cylinders through passages which rapidly increase in cross-section. Thus the velocity of the air is reduced and the noise of the exhaust is eliminated. At the same time the velocity acquired by the sudden release of the air through the exhaust port at the instant of exhaust tends to produce a vacuum behind it, as a suddenly released spring will fly upward from its support. Back-pressure upon the piston is thereby reduced and may even become a negative quantity. I finally utilize this exhaust air by passing it through a chamber 36 filled with piping, in which the hot water from the cylinder jackets is circulated and thereby causes the water to be cooled. I have also filed separate applications, one for the improved air-compressor herein shown Serial No. 548,366,—filed March 10, 1910, and one for the improved internal-combustion engine, Serial No. 548,367, filed March 10, 1910, embodying therein many features above described and in addition other features calculated to produce a new and useful effect.

What I claim and desire to secure by Letters Patent of the United States is:—

1. A locomotive having thereon an air-compressor and a multi-cylinder internal-combustion engine driving said compressor, said engine and compressor being combined in one machine having the air and gas cylinders tandem and adapted to operate at high speed, the compressed air being delivered to a storage tank and drawn therefrom to supply the propelling cylinders of the locomotive.

2. A locomotive having thereon an air-compressor and a multi-cylinder internal-combustion engine combined to form one machine with air and gas cylinders tandem, a storage tank for the compressed air, propelling cylinders adapted to use the compressed air, and a heater utilizing the exhaust gases from the engine to heat the air before its entry to the cylinders.

3. A locomotive having thereon an air-compressor and an internal-combustion engine combined in one machine, with air and gas cylinders tandem and such relative proportions as to produce a large volume of air at low pressure, a heater utilizing the exhaust gases from the engine to heat the compressed air, and cylinders adapted to use the low-pressure compressed air to propel the locomotive.

4. A locomotive propelled by compressed air produced on the locomotive itself by an air-compressor and internal-combustion engine combined in one machine, proportioned to produce a large volume of air at low pressure, a heater utilizing the exhaust gases from the engine to heat the air after the compression, and propelling cylinders arranged to work the compressed air at long points of cut-off only.

5. A locomotive propelled by compressed air produced on the locomotive itself, said locomotive having mounted upon it propelling cylinders, a multicylinder air compressor and an internal combustion engine with air and gas cylinders tandem, a storage tank for the compressed air, means for delivering the compressed air from said tank to the propelling cylinders, means for varying the output of compressed air from the compressor in proportion to its consumption by the propelling cylinders, said means comprising valves upon the inlet pipes to the air and gas cylinders, and means for automatically opening and closing said valves according to variations in pressure in the storage tank.

6. A locomotive propelled by compressed air produced on the locomotive itself, said locomotive having mounted upon it propelling cylinders, an air compressor and an internal combustion engine for driving the same, means for delivering the compressed air to the propelling cylinders, and means for heating the air on its way to said cylinders by the exhaust gases from the engine.

7. A locomotive propelled by compressed air produced on the locomotive itself, said locomotive having mounted upon it propelling cylinders, an air compressor and an internal combustion engine for driving the same, a reservoir for the compressed air and means for delivering the compressed air from the reservoir to the propelling cylinders, a heater located between the reservoir and the propelling cylinders, and means for conducting the exhaust gases from the engine to said heater.

8. A locomotive propelled by compressed air produced on the locomotive itself, said locomotive having mounted upon it propelling cylinders, an air compressor, an internal combustion engine to operate said compressor, a reservoir for the compressed air, means for delivering the air from the reservoir to said cylinders, means for heating the air before it enters the cylinders, and means for conducting the exhaust products of combustion from said engine to the heater.

9. A locomotive propelled by compressed air produced on the locomotive itself, said locomotive having mounted upon it propelling cylinders, a multi-cylinder air compressor and means for operating the same, a reservoir for the compressed air, means for delivering the compressed air from the reservoir to the propelling cylinders, and means for varying the number of cylinders in action as the pressure in the reservoir varies.

10. A locomotive propelled by compressed air produced on the locomotive itself, said locomotive having mounted upon it propelling cylinders, a multicylinder air compressor and means for operating the same, means for delivering the compressed air to said cylinders, and an auxiliary compressor adapted to deliver air to the inlet pipes of the cylinders of said multicylinder compressor.

11. A locomotive propelled by compressed air produced on the locomotive itself, said locomotive having mounted upon it propelling cylinders, a multicylinder air compressor comprising pistons reciprocating in cylinders and connected to a rotating shaft, means for delivering the compressed air to the propelling cylinders, and an auxiliary compressor driven by said shaft and adapted to deliver air to the inlet pipes of the cylinders of said multicylinder compressor.

In testimony whereof I have hereunto signed my name in the presence of two subscribing witnesses.

CHARLES WHITING BAKER.

Witnesses:
   ANNA F. RAFFENSPERGER,
   LUCY A. BAKER.